Dec. 18, 1928.

E. V. COULSTON 1,695,995

COOKING VESSEL

Filed Oct. 9, 1926

INVENTOR:
E. V. COULSTON
BY
ATTORNEY.

Dec. 18, 1928.
E. V. COULSTON
1,695,995
COOKING VESSEL
Filed Oct. 9, 1926    2 Sheets-Sheet 2
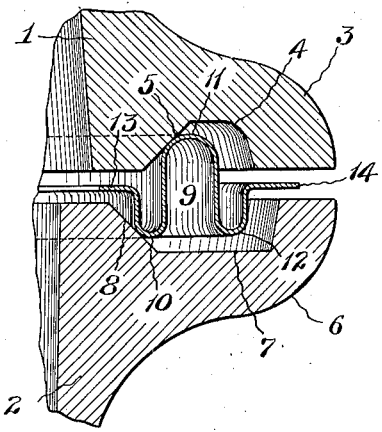
FIG. 7.
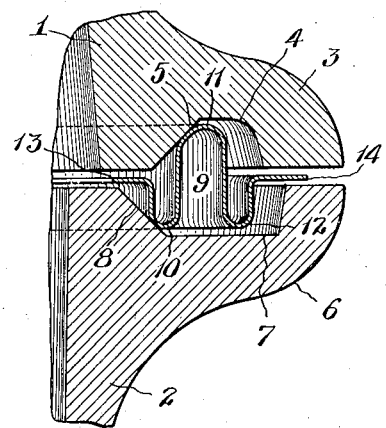
FIG. 8.
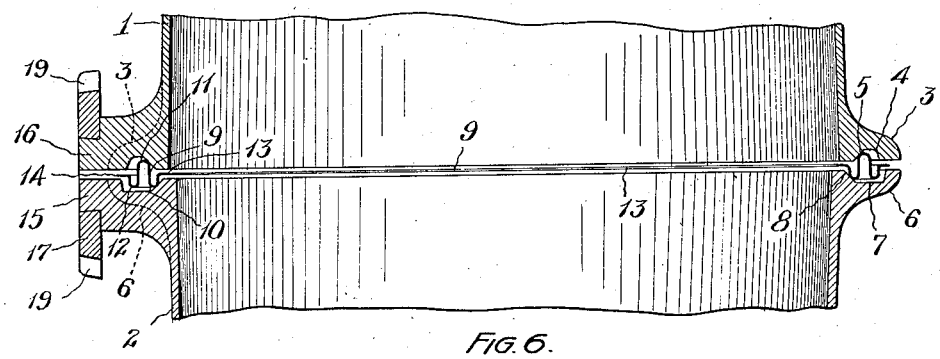
FIG. 6.
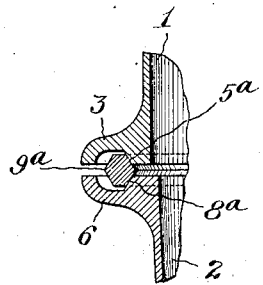
FIG. 9.   FIG. 10.
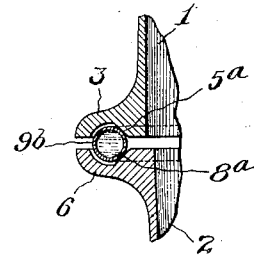
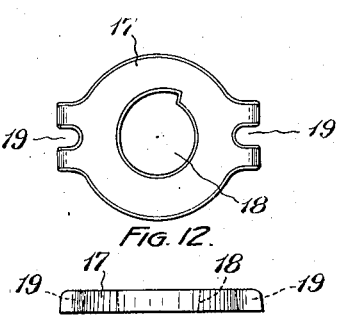
FIG. 12.
FIG. 11.
INVENTOR:
E. V. COULSTON
BY A. E. Merkel,
ATTORNEY.

Patented Dec. 18, 1928.

1,695,995

UNITED STATES PATENT OFFICE.

EARL V. COULSTON, OF SHAKER HEIGHTS, OHIO.

COOKING VESSEL.

Application filed October 9, 1926. Serial No. 140,463.

My invention relates to cooking vessels and particularly to that type wherein cooking is effected under steam pressure.

The art of cooking in a closed vessel under steam pressure is known, but as now practiced, as far as I know, the degree of pressure to be employed is governed by pressure gauges and safety valves. Safety valves are usually small, operated through a minute opening, and are controlled by a spring. The use of such a vessel for cooking purposes coats and stiffens the spring and closes the opening so that there is always danger of inefficient operation, and explosions have occurred with disastrous results.

My invention is designed to combine safety in operation of this type of cooking vessel with efficiency, and simplicity of construction, without requiring any safety valve. It consists of a device which utilizes the different expansive capacities of metals to provide a constantly tightening seal against the escape of steam up to the desired pressure, the parts being so constructed and arranged that the pressure cannot exceed a certain approximate degree, and functioning of the parts cannot be interfered with by use under any circumstances.

Herein I disclose a preferred form of construction and two modifications of the principal feature thereof, which, however, are not the only forms in which the invention may be embodied, but well exemplify the principles involved.

In the annexed drawings:

Fig. 6 is a fragmentary vertical cross-section on line VI—VI of Fig. 3.

Fig. 7 is a fragmentary sectional view on an enlarged scale showing the parts assembled before being clamped together.

Fig. 8 is a similar view showing the relation of the parts in operation.

Figs. 9 and 10 are fragmentary views showing a modification of the gasket.

Figs. 11 and 12 are, respectively, a plan and side elevation of a clamp adapted to hold together the two sections of my cooking vessel.

Figure 3:
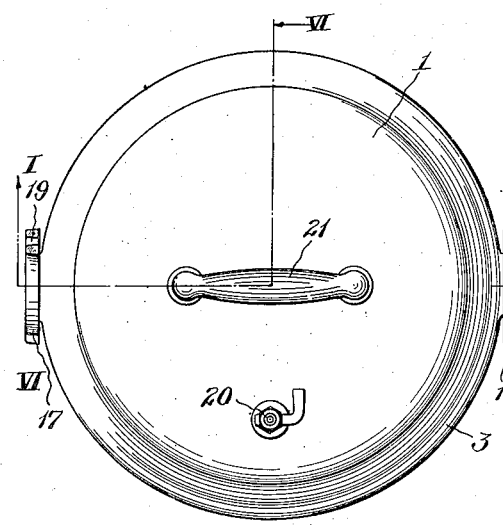
Fig. 3 is a top plan view of the cooker.
Figure 4:
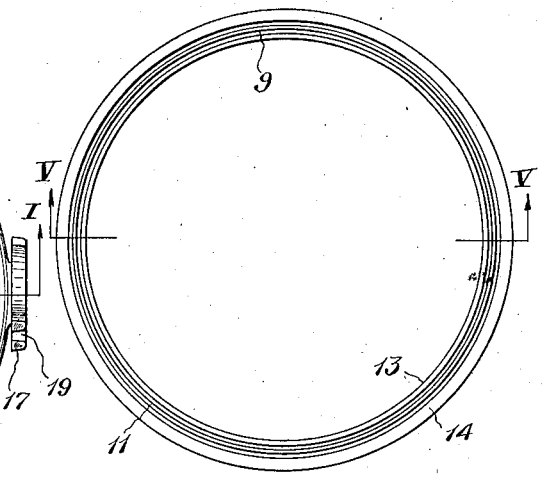
Fig. 4 is a plan view of a gasket or ring member serving as a means for closing the space between meeting edges of the two sections of the cooker.
Figure 5:
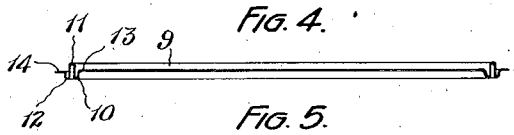
Fig. 5 is a cross-section taken on line V—V of Fig. 4.

Referring to the drawings in detail in which the same character is used throughout to designate the same part, my improved cooking vessel is composed of an upper section 1 and a lower section 2 which may be of any relative proportions, but I prefer that the lower section shall be about one-third of the total height. The upper section is closed at the top and the lower section is closed at the bottom. The upper section is provided at its lower edge with an outwardly projecting flange 3 in which is formed an annular groove 4 the inner wall of which is outwardly and upwardly inclined, as indicated at 5. The upper edge of the lower section is provided with a similarly outwardly projecting flange 6 in which is formed an annular groove 7, the inner wall of which is outwardly and downwardly inclined, as indicated at 8. The outer walls of the grooves 4 and 7 are non-essential, being a convenience only and could be omitted, leaving only the walls 5 and 8 erected on the lateral flanges 3 and 6. When the flanged edges of the two sections 1 and 2 are placed approximately together the grooves 4 and 7 register to form an annular cavity. This cavity is adapted to receive a gasket or ring structure adapted effectively to seal the joint between the two sections until the interior steam pressure exceeds a predetermined degree, beyond which the point is slightly opened by the steam pressure to permit escape of steam. This result may be accomplished in a variety of ways, but in the form in which I now contemplate embodying the principle of the invention I make the sections of the vessel of aluminum and the gasket of copper, which has a coefficient of expansion considerably less than that of aluminum. In form I prefer to stamp the gasket 9 from a sheet of copper so as to produce a plurality of annular ribs or convolutions 10, 11 and 12, with an inner flange 13 and an outer flange 14. In the embodiment shown in Figs. 1 to 8 inclusive the inclined wall 5 of the groove 4 of the upper vessel-section lies outside of the inclined wall 8 of the groove 7 of the lower vessel-section, i.

e., the inclined or beveled walls 5 and 8 are offset with respect to each other. By reason of this relation when the gasket 9 lies within the cavity formed by these registering grooves a portion of the surface of the rib 11 is engaged annularly with the inclined wall 5, and a portion of the surface of the rib 10 is engaged annularly with the inclined wall 8. The ribs 10 and 11 of the gasket function to seal the joint, the rib 12 and flanges 13 and 14 serving mainly to give the desired strength thereto. The depth of ribs 10 and 11 is so calculated that when the parts are assembled, as shown in Fig. 7, the adjacent edges of the vessel sections are not in contact, thus permitting the two sections to be drawn into snug annular contact with the gasket on the inclined surfaces of flanges 5 and 8 by means now to be described.

Figure 1:
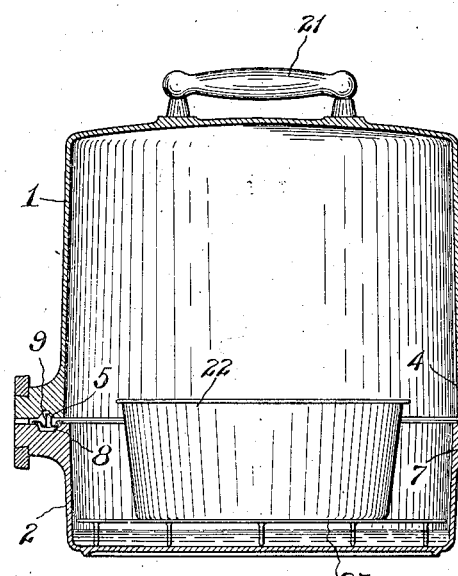
Figure 1 is a vertical section of a steam cooker constructed in accordance with my invention, taken on line I—I of Fig. 3.
Figure 2:
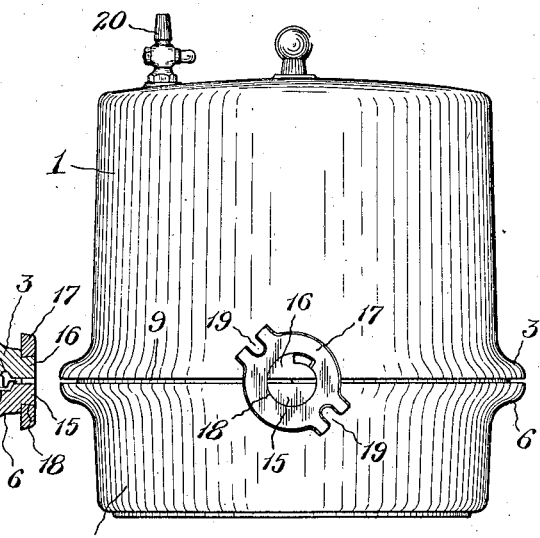
Fig. 2 is a side elevation thereof showing one of the locking devices which I prefer to employ.

For drawing the sections of the vessel together onto the gasket to make a tight non-leaking joint, different means of well-known construction may be employed, but I prefer to use two pairs of lugs projecting from the flanges 3 and 6 at diametrically opposite points, each pair consisting of a lug 15 on the lower vessel-section and a mating lug 16 on the upper vessel-section, as clearly shown in Figs. 1 and 2. The combined edge surfaces of the lugs 15 and 16 are in the form of an involute cam. Cooperating with each pair of lugs 15 and 16 is a clamping member 17 provided with a cam-shaped aperture 18 conforming to the cam-surfaces on the lugs 15 and 16. The outer edge of the clamping member 17 is provided with notches 19 to receive a tool suitable for rotating it.

The gasket member may be constructed in other forms. It might be constructed in the form of a solid ring 9ª of substantially diamond-shape in cross-section, as indicated in Fig. 9, or it might be constructed in the form of a hollow ring 9ᵇ circular in cross-section, as indicated in Fig. 10. Where either of these forms is employed, the inner beveled walls 5ª, 8ª, on the adjacent edges of the vessel-sections will necessarily be at the same distance from the center of the vessel, as will be obvious.

The top of the vessel is provided with a petcock 20 for relieving pressure in the vessel by hand after cooking is completed. For convenience in handling the upper end of the vessel is provided with a handle 21.

Steam cookers are well known in the art and the manner of their use, therefore, need not be here described. As in prior practice, a plurality of nested or racked food containers may be inserted in the vessel, only one being shown in the drawings as indicated at 22. Where food which does not of itself supply sufficient moisture during the cooking process is to be cooked, a small amount of water should be placed in the bottom of the vessel, as indicated in Fig. 1, and in such case it is desirable to support the food containers 22 above the water level on a platform 23.

The procedure followed in the use of my cooker will be obvious from the above description. With the parts assembled, the food containers 22 filled with food to be cooked, are placed in the lower section 2 of the vessel with or without water, and with or without the platform 23 in the bottom thereof, as the nature of the food requires. The gasket 9 is then inserted in the groove 7 of the lower section. The upper section 1 is then put in place, the cam-lugs 15 and 16 are brought into registry, and the clamping disks 17 are engaged with the lugs and rotated until the beveled walls 5 and 8 are pressed into firm engagement with the ribs 10 and 11 of the gasket 9. The assembled vessel is then placed over the source of heat and permitted to remain until the cooking is finished. If the source of heat is such that too much steam is generated, resulting in the constant escape of steam past the joint between the vessel-sections, the heat may be reduced or the vessel moved to another point where the heat is not so intense, but in no case can more than the approximate pressure desired be accumulated.

According to the principles herein set out cooking vessels may be constructed to operate at any predetermined pressure, above which steam will escape past the joint formed by the gasket 9 and the inclined walls of the vessel-sections. The predetermined pressure at which steam will escape is governed by the nature of the material selected for the vessel and gasket and by the relative dimensions of these parts, chiefly the cross-sectional area of the flanges 3 and 6.

The results of experimental work serve to assist in understanding the principles of operation of my device. Vessel-sections having abutting edges as perfect and smooth as could be constructed by the best mechanic, when placed together and without a gasket member or clamps, permitted the escape of steam at any pressure above atmospheric. With the addition of four equi-distant clamps, such as disclosed above, it was found that steam freely escaped from the joint, at a pressure slightly greater than atmospheric. But with the addition of the gasket member, associated with inclined surfaces on the flanges of the vessel-sections, the problem of holding a useful steam pressure within the vessel was solved. As the sealing joint is obscured during operation the action of the parts cannot be observed, but the theory upon which the device is constructed, and with which the results achieved in practice are in accord, may be explained as follows:

Assume that the gasket 9 is inserted in the grooves of the flanges 3 and 6, the gasket being of metal having a much less coefficient of expansion than that of the vessel within the range of temperatures encountered in the art. Increase in temperature would cause the vessel to expand, or increase in diameter, more rapidly than the gasket, as a result of which the inclined walls 5 and 8 of the grooves 4 and 7 in the sections of the vessel would move radially to a greater extent than the contacting surfaces 10 and 11 and therefore would be pressed more and more firmly into engagement as the temperature increased. With increasing steam pressure, however, another factor comes into play, namely, an increasing inside force tending to push the sections apart. The force of vessel expansion is horizontal against a slower expanding gasket and this in combination with the up and down force of the steam pressure inside causes the beveled surfaces 5 and 8 to slip on ribs 10 and 11 but to maintain tight contact until the expansion force has reached its end while the inner pressure still increases. Then the only remaining opposition to the inner pressure is the elastic resistance of the vessel material which at once begins to yield the very slight distortion needed to permit escape of steam. After this point, very little additional steam pressure can be generated no matter how intense may be the heat applied. And by lessening the heat at this point a proper cooking pressure can be maintained without escape of any steam, there being a point at which the various factors balance each other, which can be regulated to desired limits by the dimensions of the structural parts.

Distortions of the gasket and vessel are not beyond their elastic limit and they therefore return to original form after the steam pressure is released.

While I have disclosed a preferred form of the principal feature of my invention, it is to be understood that my invention is not to be confined to the details shown but includes all modifications or changes coming within the terms of the appended claims.

What I claim is:

1. A steam retaining vessel comprising upper and lower sections whose outer edges are provided with outwardly diverging surfaces, a gasket interposed between said outer edges and having surfaces engaging said diverging surfaces, said gasket having a coefficient of expansion less than the sections of the vessel, and means to secure the vessel sections together, the construction being such as to cause the deformation of the vessel sections, within elastic limits, at a predetermined pressure to permit the escape of steam at the joint formed by the gasket and the diverging surfaces.

2. The combination specified in claim 1 in which the gasket is of copper and the vessel-sections are of aluminum.

3. The combination specified in claim 1 in which the means for securing the vessel-sections together consist of detachable diametrically opposed rotatable clamps having cam surfaces and cooperating surface portions formed upon said upper and lower vessel sections.

4. The combination specified in claim 1 in which the gasket is shaped from a plate of metal into a plurality of convolutions, one of which engages the diverging surface of the upper vessel-section and another of which engages the diverging surface of the lower vessel-section.

5. A cooking vessel comprising upper and lower sections provided with registering grooves adjacent their outer edges, said grooves having inner outwardly diverging surfaces, a gasket set in the cavity formed by the registering grooves and having surfaces snugly engaging said diverging surfaces, said gasket being constructed of metal having a coefficient of expansion less than the vessel-sections and in vertical dimensions such as to slightly separate the vessel-sections when the parts are assembled, and means for clamping the vessel-sections together in snug contact with the gasket.

6. The combination specified in claim 1 in which the outwardly diverging surfaces of the two vessel sections are offset with respect to each other.

7. The combination specified in claim 1 in which the vessel edges form an annular cavity between them and in which the gasket is formed into a plurality of convolutions, one of which engages the diverging surface of the cavity portion formed by the upper vessel section and another of which engages the diverging wall of the cavity portion formed by the lower vessel section.

Signed by me this 14th day of September, 1926.

EARL V. COULSTON.